United States Patent [19]

Kobayashi et al.

[11] Patent Number: 5,235,786

[45] Date of Patent: Aug. 17, 1993

[54] HOURGLASS WORM GEAR

[75] Inventors: Tohru Kobayashi; Nobuyuki Tomita; Tsunetoshi Sonohara; Hiroshi Kawada, all of Nagoya; Shigeyuki Shimachi, Sendai; Hiroshi Gunbara, Matsue, all of Japan

[73] Assignee: Mitsubishi Jukogyo Kabushiki Kaisha, Tokyo, Japan

[21] Appl. No.: 933,206

[22] Filed: Aug. 21, 1992

Related U.S. Application Data

[63] Continuation-in-part of Ser. No. 608,469, Nov. 2, 1990.

[30] Foreign Application Priority Data

Nov. 6, 1989 [JP] Japan ................................. 1-287345
Jan. 22, 1990 [JP] Japan ................................. 2-10659

[51] Int. Cl.$^5$ ............................................. B24B 7/19
[52] U.S. Cl. ............................... 51/287; 51/105 GG; 405/51; 405/26
[58] Field of Search ............ 51/DIG. 1, 287, 105 GG, 51/56 G, 95 GH, 123 G; 409/51, 26, 38, 48

[56] References Cited

U.S. PATENT DOCUMENTS

| | | | |
|---|---|---|---|
| 2,861,502 | 11/1958 | Caubet | 90/3 |
| 4,998,385 | 3/1991 | Umezono | 51/287 |
| 5,018,403 | 5/1991 | Umezono | 51/287 |

FOREIGN PATENT DOCUMENTS

| | | |
|---|---|---|
| 1963693 | 12/1969 | Fed. Rep. of Germany . |
| 2727894 | 1/1978 | Fed. Rep. of Germany . |
| 56-29147 | 7/1981 | Japan . |
| 62-19970 | 5/1987 | Japan . |

OTHER PUBLICATIONS

An Investigation on Seconday Action on Skew Gears Feb. 1975, pp. 25–32.

*Primary Examiner*—Bruce M. Kisliuk
*Assistant Examiner*—Eileen P. Morgan
*Attorney, Agent, or Firm*—Birch, Stewart, Kolasch & Birch

[57] ABSTRACT

The improved hourglass worm gear which has been produced by grinding a blank for the worm gear by rotating a grinding wheel about a grinding wheel shaft A while turning the grinding wheel shaft A about a tool shaft A3 which extends in parallel with a wheel shaft A2 perpendicular to a worm shaft A1 is characterized in that a cross-sectional shape of the grinding wheel taken in a plane inclusive of the grinding wheel shaft A exhibits a circular arc.

Since the cross-sectional shape of the grinding wheel for successively grinding a series of gear tooth surfaces on the hourglass worm gear is contoured in the form of a circular arc, the hourglass worm gear assures that a radius r of the circular arc has an increased degree of freedom and an ideal contact pattern can be obtained by properly adjusting the radius r.

A contour of each gear tooth shape having few variation of gear tooth engagement is determined by correctly adjusting the radius r of the circular arc as well as various conditions associated with correct generation of a series of gear tooth surfaces on the worm gear in order to assure the ideal contact pattern regardless of displacement of shafts as well as displacement of each gear tooth under a large magnitude of load.

2 Claims, 9 Drawing Sheets

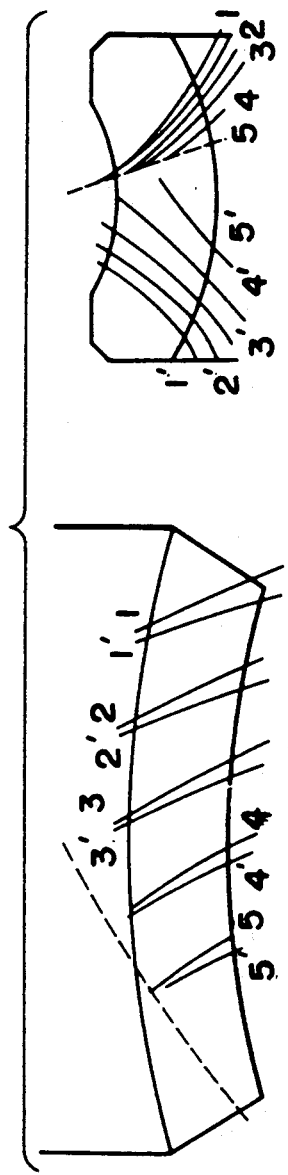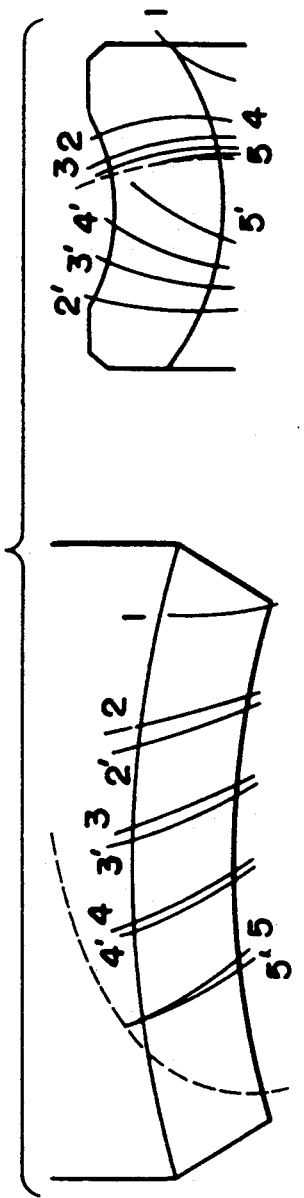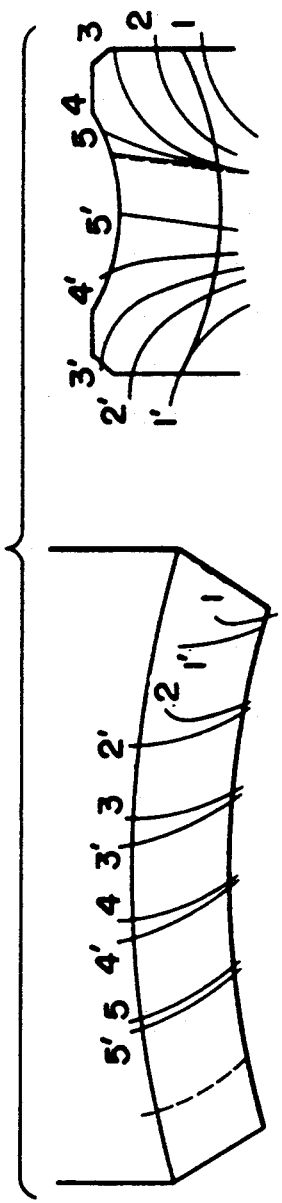
FIG. 3(A) r = 0.4
FIG. 3(B) r = −0.5
FIG. 3(C) r = −0.2

HOURGLASS WORM GEAR

This application is a continuation-in-part of application Ser. No. 07/608,469 filed on Nov. 2, 1990, the entire contents of which are hereby incorporated by reference.

FIELD OF THE INVENTION AND RELATED ART STATEMENT

The present invention relates generally to an hourglass worm gear adapted to mesh with a worm wheel. More particularly, the present invention relates to an hourglass worm gear preferably employable for a worm type reduction gear or the like speed changing unit.

A method of producing a prior hourglass worm gear adapted to mesh with a worm wheel has been disclosed in an official gazette of Japanese Publication Patent NO. 19970/1987.

An outline of this prior invention will briefly be described below with reference to FIG. 10.

In the drawing, reference numeral I designates a worm shaft, reference numeral II designates a wheel shaft and reference numeral III designates a shaft of an intermediate gear operable for producing an hourglass worm gear. In addition, an absolute coordinate having a space held immovable is represented by O-xyz in a right-hand orthogonal coordinate system wherein an x-coordinate orients in the direction of the worm shaft I, a z-coordinate orients in the direction of the wheel shaft II and a y-coordinate orients in the direction of a common perpendicular line to the shafts I and II extending through points $O_1$ and $O_2$. As is apparent from FIG. 10, the intermediate gear shaft III intersects the common perpendicular line $O_2O_1$ at a point $O_3$ at a right angle but slantwise extends through the point $O_3$ by an angle relative to the wheel shaft II. It should be noted that the point $O_1$ is an intersection where the worm shaft I intersects the common perpendicular line $O_2O_1$ and the point $O_2$ is an intersection where the wheel shaft II intersects the same. When it is assumed that a rotational speed of the worm shaft I is represented $\omega_1$, a rotational speed of the wheel shaft II is represented by $\omega_2$, a rotational speed of the intermediate gear shaft III is represented by $\omega_3$, a translational speed of the intermediate gear in the direction along the intermediate gear shaft III is represented by $v_3$, two rotational speed ratios are represented by $i = \omega_1/\omega_2$, $j = \omega_1/\omega_3$, a pitch of screw movement of the intermediate gear is represented by $h = v_3/107_3$, a distance between the two points $O_2$ and $O_1$ is represented by $e$ and a distance between the two points $O_3$ and $O_1$ is represented by $e_1$, the following three equations are established in accordance with an intermediate gear theory.

$$e_1 = e \cos^2 a \quad (1)$$
$$j = i \cos a - \sin a \quad (2)$$
$$h = v_3/\omega_3 = e \sin a \cdot \cos a \quad (3)$$

To the contrary, in a case where a gear cutting tool having a suitable configuration is mounted on the intermediate gear shaft III which satisfies the foregoing equations (1) to (3) so that a gear cutting operation is performed for a blank for a worm gear mounted on the worm shaft I and a blank for a worm wheel mounted on the wheel shaft II, the worm gear comes in contact with the worm wheel with the same contact line therebetween (hereinafter referred to as a first contact line) as a contact line between the intermediate gear and the worm gear. This method of generating a worm gear and a worm wheel has been heretofore referred to as an indirect generating method.

Especially, in a case where the angle a is zero, the intermediate gear shaft III coincides with the wheel shaft II and in a case where the angle a is 90°, the intermediate gear shaft III coincides with the worm shaft I. In either case, therefore, it is not substantially required that the presence of the intermediate gear is taken into account. Thus, in these cases, this method of generating a worm and a worm wheel has been heretofore referred to as a direct generating method.

In addition, according to the "twice contact theory", in a case where a worm wheel is directly generated by using a tool of which configuration is coincident to the configuration of the worm gear which has been generated by using the intermediate gear which satisfies the conditions represented by the aforementioned equations (1) to (3) or partially coincident to the same, the worm wheel is brought in contact with the worm wheel at a twice contact line $T_2$ (hereinafter referred to as a second contact line) as shown in FIGS. 7(A) and 7(B), in addition to the simultaneous contact at a first contact line $T_1$. It should be noted that a relative radius of curvature becomes infinitely large at the location where the worm gear is just once brought in contact with the worm wheel. In practice, it is required that the line along which it can be expected that the relative radius of curvature becomes infinitely large is located within the range where the worm gear meshes with the worm wheel. To meet the requirement, there unavoidably arises a problem as to how the shape to be assumed by each gear tooth on the intermediate gear is determined.

According to the method as disclosed in an official gazette of Japanese Publication Patent NO. 19970/1987, a conical surface (which may include a flat surface in a special case) is employed as a gear tooth surface for the intermediate gear.

FIG. 7(A) schematically illustrates an hourglass worm gear produced in accordance with the method which has been disclosed in an official gazette of Japanese Publication Patent NO. 19970/1987 and FIG. 7(B) schematically illustrates a worm wheel to mesh with the hourglass worm gear shown in FIG. 7(A).

According to the prior invention, the hourglass worm gear has a plurality of contact lines as shown in FIG. 7(A), and the ineffective gear tooth surface represented by hatching lines extends to the region in the vicinity of the central part of the worm gear tooth.

On the other hand, a worm wheel which is to mesh with the hourglass worm gear produced in accordance with the prior invention has a plurality of curves each defined by a series of points on limitative normal lines, as shown in FIG. 7(B). With this worm wheel, the simultaneous contact lines and the direction of a relative speed define a small angle t with the result that a film of lubricant is insufficiently formed on each of the gear tooth surfaces.

A grinding wheel for grinding gear tooth surfaces on the hourglass worm gear is contoured in the conical shape as shown in FIG. 8 and FIG. 9, and a cross-sectional shape of the grinding wheel taken along a shaft thereof is composed of straight lines. In a case where a grinding operation is performed as shown in FIG. 8, the generation line of the conical shape is used as a grinding wheel surface. On the other hand, in a case where a grinding operation is performed as shown in FIG. 9, the bottom surface of the conical shape is used as a grinding wheel surface.

In FIG. 8 and FIG. 9, reference numeral 01 designates a blank for the hourglass worm gear, reference numeral 02 designates a conical grinding wheel, reference numeral 03 designates a motor for rotationally driving the grinding wheel 02 and reference numeral 04 designates another conical grinding wheel of which a bottom surface is used as a grinding wheel surface.

The conventional hourglass worm gear as constructed and generated in the above-described manner has been found to have the following problems.

(1) A pressure prevailing over the contact surface of a gear tooth and a thickness of the lubricant film both of which have a substantial effect on a performance of the hourglass worm gear are largely governed by three parameters, i.e., (1) a length of each simultaneous contact line, (2) a relative radius of curvature at each contact point and (3) an angle defined by the simultaneous contact line and the direction of a relative speed.

(2) According to the prior invention, the hourglass worm gear does not have any degree of freedom on the configuration to be assumed by a grinding wheel for generating a gear tooth shape. This makes it difficult to attain modification and improvement in consideration of the aforementioned parameters (1) to (3).

(3) When the conventional hourglass worm gear receives a large load, a contact pattern of the hourglass worm gear having an unstable lead and an unstable pressure angle on the gear tooth surface thereof is deteriorated due to an adverse influence induced by displacement of the worm shaft attributable to deformation of bearings, resulting in its own excellent properties (high efficiency and high load bearing ability) failing to be exhibited satisfactorily.

(4) Consequently, the present general status of the conventional hourglass worm gear is such that a case hardening steel is employed as a material for the worm gear and a material having a high property of well-fitting to the opponent gear tooth surface on the worm gear but having a low strength (e.g., JIS PBC2, AlBC2 or the like each having a hardness ranging from about 100 to 150 $H_B$) is employed as a material for the worm wheel. This leads to the result that the hourglass worm gear has a low load bearing ability.

(5) An engineering plastic material cannot be used as a material available for the worm gear.

OBJECTS AND SUMMARY OF THE INVENTION

The present invention has been made with the foregoing background in mind.

Therefore, an object of the present invention is to provide an hourglass worm gear which has a small ineffective gear tooth surface region as well as a method of producing the same.

Another object of the present invention is to provide an hourglass worm gear of an effective gear engagement range is substantially enlarged and of which load bearing ability is substantially improved as well as a method of producing the same.

Another object of the present invention is to provide an hourglass worm gear which assures that an angle defined by simultaneous contact lines and the direction of a relative speed can be enlarged and a thickness of lubricant film can be increased, as well as a method of producing the same.

Further, another object of the present invention is to provide an hourglass worm gear for which a material having excellent mechanical properties and a high strength can be used, as well as a method of producing the same.

To accomplish the above objects, the present invention provides an hourglass worm gear adapted to mesh with a worm wheel, wherein a torus type grinding wheel is substituted for the conventional conical type grinding wheel which has been used for practicing a method of producing an hourglass worm gear adapted to mesh with a worm wheel as disclosed in an official gazette of Japanese Publication Patent NO. 19970/1987.

More specifically, the present invention provides a hourglass worm gear adapted to mesh with a worm wheel, a series of gear tooth surfaces on the hourglass worm gear being generated by grinding a blank for the worm gear by rotating a grinding wheel about a grinding wheel shaft A at a high speed while turning the grinding wheel shaft A about a tool shaft A3 in parallel with a wheel shaft A2 extending perpendicular to a worm shaft A1, wherein a shape of a sectional plane inclusive of the grinding wheel shaft A of the grinding wheel exhibits a circular arc.

With the hourglass worm gear of the present invention, since the shape of the grinding wheel for grinding a series of gear tooth surfaces on the hourglass worm gear is contoured to assume a circular arc, a radius r of the circular arc of the grinding wheel has an increased degree of freedom, and an ideal contact pattern can be obtained by properly adjusting the radius r of the circular arc.

A series of gear tooth surfaces on the hourglass worm gear which have few variation of gear tooth engagement can be generated by properly adjusting the radius r of the circular arc and various conditions associated with a gear tooth generating operation in order to maintain the aforementioned ideal contact pattern regardless of displacement of either shaft and displacement of gear teeth in a highly loaded state.

According to the present invention, since the hourglass worm gear is generated by using a torus type grinding wheel for grinding gear tooth surfaces of which radius of curvature is represented by $r=(-0.3$ to $1.0)$ e where e designates a center distance between the worm shaft and the wheel shaft, the following advantageous effects are obtained.

(1) An effective gear tooth engagement range can be widened and a load bearing ability can be improved substantially.

(2) An angle defined by simultaneous contact lines and the direction of a relative speed can be enlarged and a thickness of lubricant film can be increased. Consequently, it can be expected that an operational efficiency of the hourglass worm gear can be improved substantially.

(3) Deterioration of a contact pattern in the load state and undesirable reduction of an effective gear tooth engagement area can be prevented reliably (it is possible to maintain 80% of a normal gear tooth engagement area).

(4) It becomes possible to use a material for the worm wheel having excellent mechanical properties and a high strength by virtue of the advantageous effects as mentioned in the preceding paragraphs (1) to (3), whereby a load bearing ability can be improved further.

Specifically, it becomes possible to use, e.g., a copper alloy or a steel having a hardness ranging from 200 to 300 $H_B$ as a material for the worm wheel.

In addition, an engineering plastic material may be used as a material for the worm wheel.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which:

FIGS. 3(A) to 3(C) are an illustrative view which shows a locus of a series of contact lines along which the hourglass worm gear of the present invention shown in FIG. 1 meshes with a worm wheel, respectively;

FIGS. 6(A) and 6(B) are an illustrative view which shows variation of a gear tooth engagement surface along which the hourglass worm gear of the present invention meshes with a worm wheel, respectively, wherein FIG. 6(A) shows a case where one of a worm shaft and a wheel shaft is displaced relative to the other one and FIG. 6(B) shows a case where no shaft displacement takes place;

DETAILED DESCRIPTION OF THE PREFERRED EMBODIMENTS

Figure 1A:
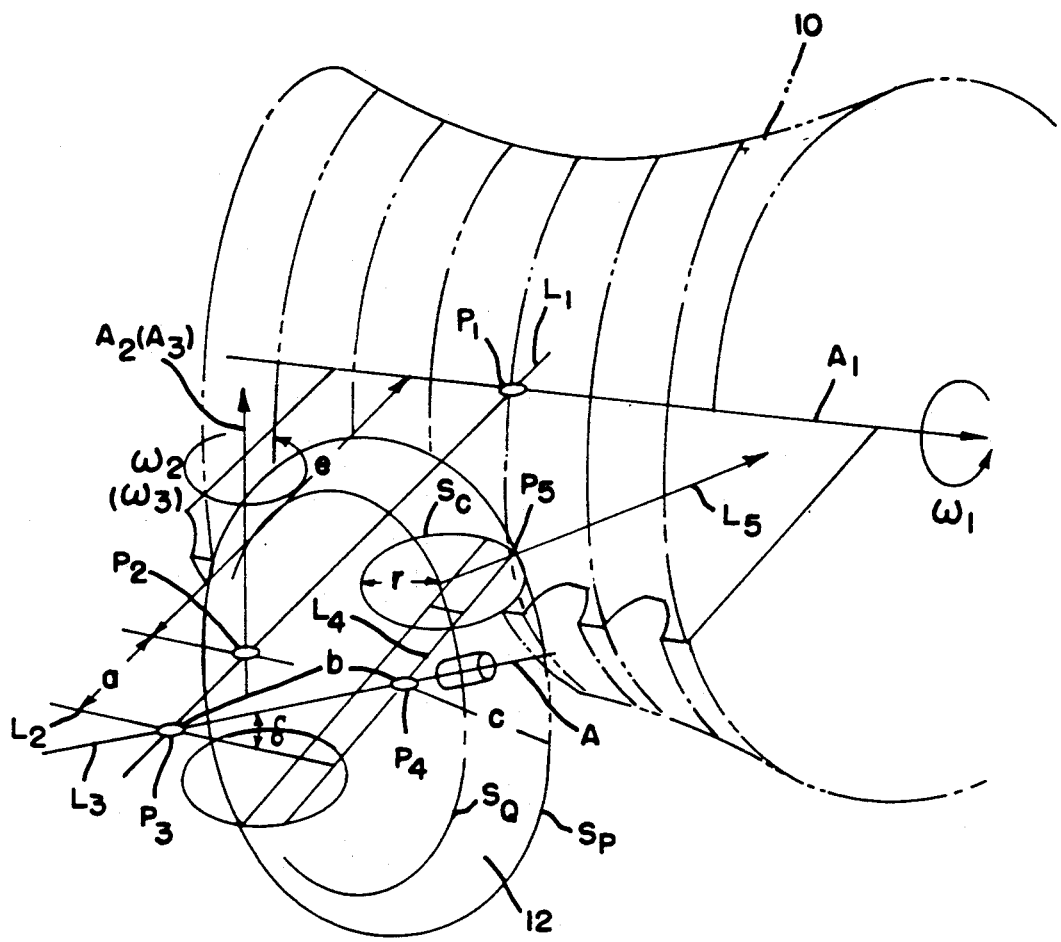
FIG. 1(a) is a perspective view of a worm gear and a circle $S_P$ as a trace of a point on a surface $S_C$ of a torus.

Now, the present invention will be described in detail hereinafter with reference to the accompanying drawings which illustrate preferred embodiments of the present invention.

FIRST EMBODIMENT

An hourglass worm gear adapted to mesh with a worm wheel in accordance with a first embodiment of the present invention will be described below with reference to FIG. 1 to FIG. 4.

In the drawings, $A_1$ designates a worm shaft, $A_2$ designates a wheel shaft, $A_3$ designates a tool shaft, A designates a grinding wheel shaft, $\omega_1$ designates an angular speed of an hourglass worm gear, $\omega_2$ designates an angular speed of a worm wheel, $\omega_3$ designates an angular speed of a tool, i is a ratio of the angular speed of the worm gear to the angular speed of the worm wheel ($=|\omega_1|/|\omega_2|$), Q designates a center of a circular arc representing a sectional shape of a grinding wheel, $S_C$ designates a circular arc representing a sectional shape of the grinding wheel, $S_Q$ designates a locus scribed by the point Q about the grinding wheel shaft A, r designates a radius of the circular arc $S_C$ and e designates a center distance between the worm shaft $A_1$ and the wheel shaft $A_2$.

Characterizing features of the hourglass worm gear of the present invention will be described below.

(1) The hourglass worm gear, is generated by using the grinding wheel 12 including a torus surface to serve as a grinding surface. As shown in FIG. 1(a), tool shaft $A_3$ is located at the same position as that of the wheel shaft $A_2$, and a quantity of displacement of the tool relative to the worm gear to be generated as represented by $\omega_3$ and $\omega_1$ coincides with a quantity of displacement of the worm wheel relative to the worm gear as represented by $\omega_2$ and $\omega_1$ (Refer to FIG. 2).

(2) The worm wheel is generated by using a hob including a basic curved surface coincident to the worm gear tooth surface.

(3) With the hourglass worm gear as designed in the above-described manner, dual line contact takes place along two contact lines, i.e., a contact line that is a primary contact line along which the worm gear first comes in contact with the grinding wheel (first contact line) and a contact line along which the worm gear secondarily comes in contact with the grinding wheel (second contact line). Thus, the first locus surface and the second locus surface representing locus surfaces defined by the foregoing contact lines intersect each other along a curved line defined by a series of points on limitative normal lines. In this respect, the hourglass worm gear of the present invention is basically coincident to the prior hourglass worm gear.

(4) The worm tooth surface is divided into two regions by the curved line defined by a series of points on limitative normal lines, and one of the two regions is an ineffective gear tooth surface portion. In a case where the hourglass worm gear meshes with the worm wheel at a right angle, the aforementioned curved line intersects the common perpendicular line to the worm shaft and the wheel shaft. Thus, the hourglass worm gear of the present invention makes it possible to locate the foregoing intersection away from the effective gear tooth engagement region, i.e., toward the worm shaft as far as possible so as to allow the effective gear tooth engagement region to be widened.

(5) Design example

Figure 1B:
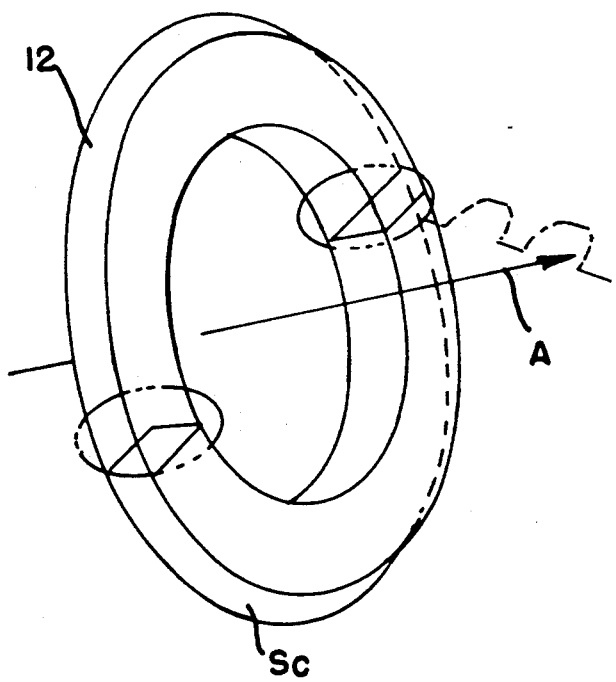
FIG. 1(b) is an example of a grinding wheel in the form of a torus rotatable around axis A of FIG. 1(a)

Referring to FIG. 1 and FIG. 2 again, the wheel shaft A2 coincides with the tool shaft A3 that is a rotational shaft of the grinding wheel. A straight line intersecting the worm shaft A1 and the wheel shaft A2 at a right angle is represented by L1, the intersection where the worm shaft A1 intersects the straight line L1 is represented by P1, the intersection where the wheel shaft A2 intersects the straight line L1 is represented by P2, the distance between the point P1 and the point P2 is represented by e, the point located on the straight line L1 at a distance a beyond the point P2 is represented by P3, the straight line extending through the point P3 in parallel with the shaft A1 is represented by L2, the straight line derived by turning the straight line L2 about the straight line L1 by an angle δ is represented by which corresponds to the grinding wheel shaft A, the point located on the straight line L3 away from the point P3 by a distance b is represented by P4, the straight line extending through the point P4 in parallel with the straight line L1 is represented by L4, the point located on the straight line L4 away from the point P4 by a distance c is represented by P5, the straight line located on the plane inclusive of the straight line L3 and the straight line L4 while slantwise extending by an angle a relative to the dashed line which is perpendicular to the straight line L3 and intersecting the straight line L4 at the point P5 is respresented by L5, and the point located on the straight line L5 away from the, point P5 by a distance r is represented by Q. With such an arrangement as mentioned above, the cross-sectional shape of the grinding wheel exhibits a circular arc $S_C$ which extends about the point Q. In addition, the grinding wheel includes a surface, i.e., a torus surface which is formed by turning the the circular arc $S_C$ about the straight line L3, and an average radius of the grinding wheel on the torus surface is represented by c. It should be added that the locus scribed by the point Q is represented by $S_Q$.

A required hourglass worm gear is produced by arranging a grinding wheel shaft A including the aforementioned torus surface in the form of a rotational shaft such that the grinding wheel shaft A coincides with the straight line L3 and then gradually turning the grinding wheel about the tool shaft A3 while rotating the grinding wheel about the grinding wheel shaft A at a high speed. At this time, rotation of the grinding wheel about the tool shaft A3 is synchronized with rotation of a blank for the required hourglass worm gear about the worm shaft A1 in accordance with the intermediate gear theory as described above.

Figure 2A:
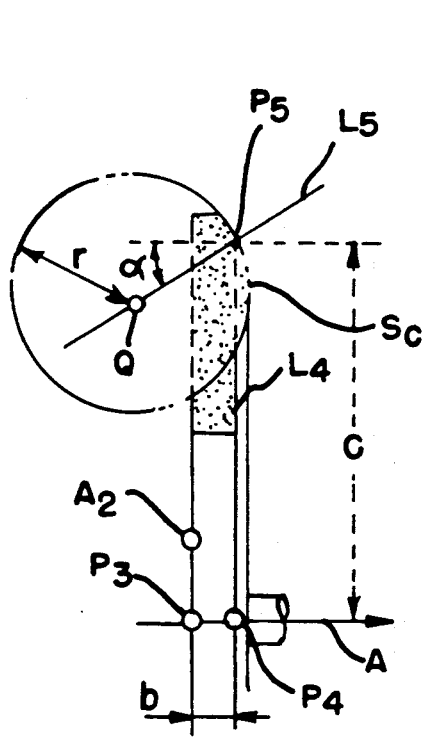
FIG. 2(a) is a cross-sectional view of the torus of $r>0$ in which an outer surface of the torus is convex with a center Q of the circle of the outer surface $S_c$ being positioned at the grinding wheel side.
Figure 2B:
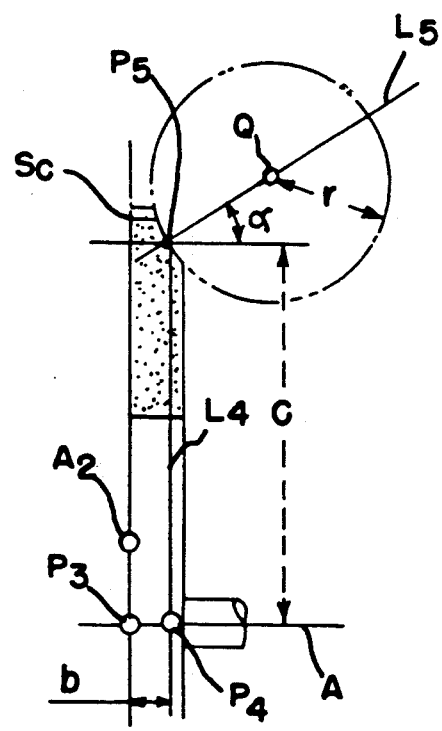
FIG. 2(b) is a cross-sectional view of the torus of $r<0$ in which an outer surface of the torus is concave with a center Q of the outer surface $S_c$ being positioned at the worm gear side

It should be noted that when the distance r is more than zero, the resultant grinding wheel surface exhibits a convex torus contour and when the distance r is less than zero, the resultant grinding wheel surface exhibits a concave torus contour. As shown in FIGS. 2(a) and 2(b), when the radius r is positive, the center of the circle of the cross section is positioned at the grinding wheel side and the contour surface of the torus is convex. When the radius r is negative, the center is positioned at the worm gear side and the contour surface of the torus is concave.

When the speed reduction ratio i is set to 40, the hourglass worm gear of the present invention assumes dimensions as shown in Table 1, for example.

TABLE 1

| center distance between worm gear and worm wheel : e | | 1.0 mm |
|---|---|---|
| angle defined by worm gear shaft and worm wheel shaft | | 90° |
| speed reduction ratio : i | | 40 |
| dimensions associated with grinding wheel | α | 20° |
| | δ | 12° |
| | a | 0.20061 mm |
| | b | 0.03058 mm |
| | c | 1.0 mm |

Next, description will be made below with reference to Table 1 as to the results derived from analyzing a contact pattern of the grinding wheel as well as variation of gear tooth engagement appearing in a loaded state as the radius r (indicative of the circular arc of the grinding wheel) varies, in comparison with those derived from the prior hourglass worm gear.

FIGS. 3(A) to (C) show a locus scribed by a plurality of contact lines (where the speed reduction ratio i is 40), respectively. When the radius r is −0.2mm see FIG. 3(C)), the curve defined by a series of points on limitative normal lines is displaced in the direction toward the worm shaft, whereby the effective gear tooth engagement range is widened.

In addition, when the radius r is −0.2mm FIG. 3(C)), the contact line appearing in the region extending from the throat portion of the worm wheel to the end part of gear tooth engagement assumes a large angle relative to the direction of extension of each gear tooth.

Referring to FIGS. 3(A) to (C) again, reference numerals (1) to (5) and (1)' to (5)' designate the number of each contact line, respectively.

Figure 7A:
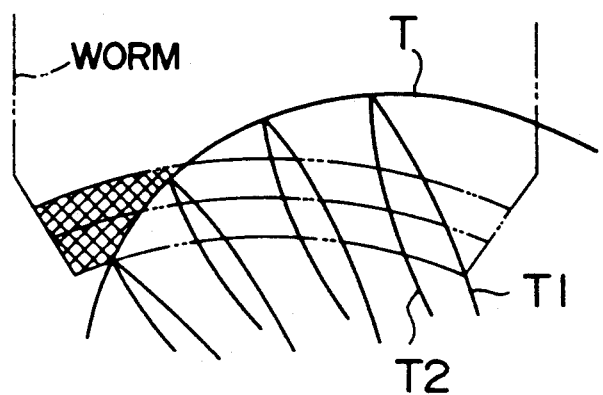
FIG. 7(A) is a fragmentary view which schematically illustrates a prior hourglass worm gear produced in accordance with a method of producing a hourglass worm gear adapted to mesh with a worm wheel as disclosed in an official gazette of Japanese Publication Patent NO. 19970/1987.
Figure 7B:
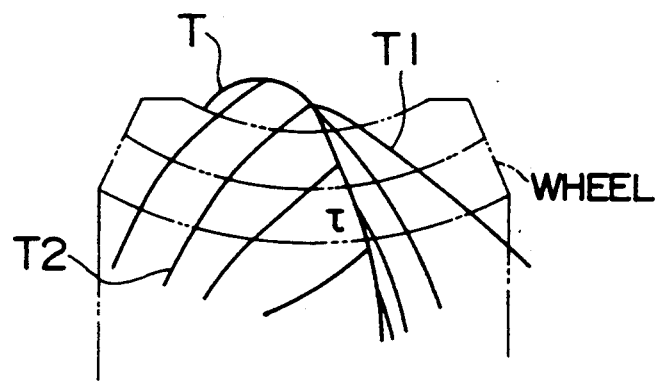
FIG. 7(B) is a fragmentary view which schematically illustrates a worm wheel meshing with the prior hourglass worm gear shown in FIG. 7(A)

With the conventional hourglass worm gear, it has been found that most of the curves each defined by a series of points on limitative normal lines pass from the dedendum toward the addendum in the region extending from the central part of gear tooth engagement with the worm wheel to the outlet of the same (see FIG. 7(A)). As a result, a part of the tooth surface of the worm gear becomes ineffective, resulting in the gear tooth engagement range being undesirably restricted. Additionally, it has been found that the conventional hourglass worm gear has few contact lines at the end part of gear tooth engagement which exhibit a large angle relative to the direction of a relative speed.

Figure 4:
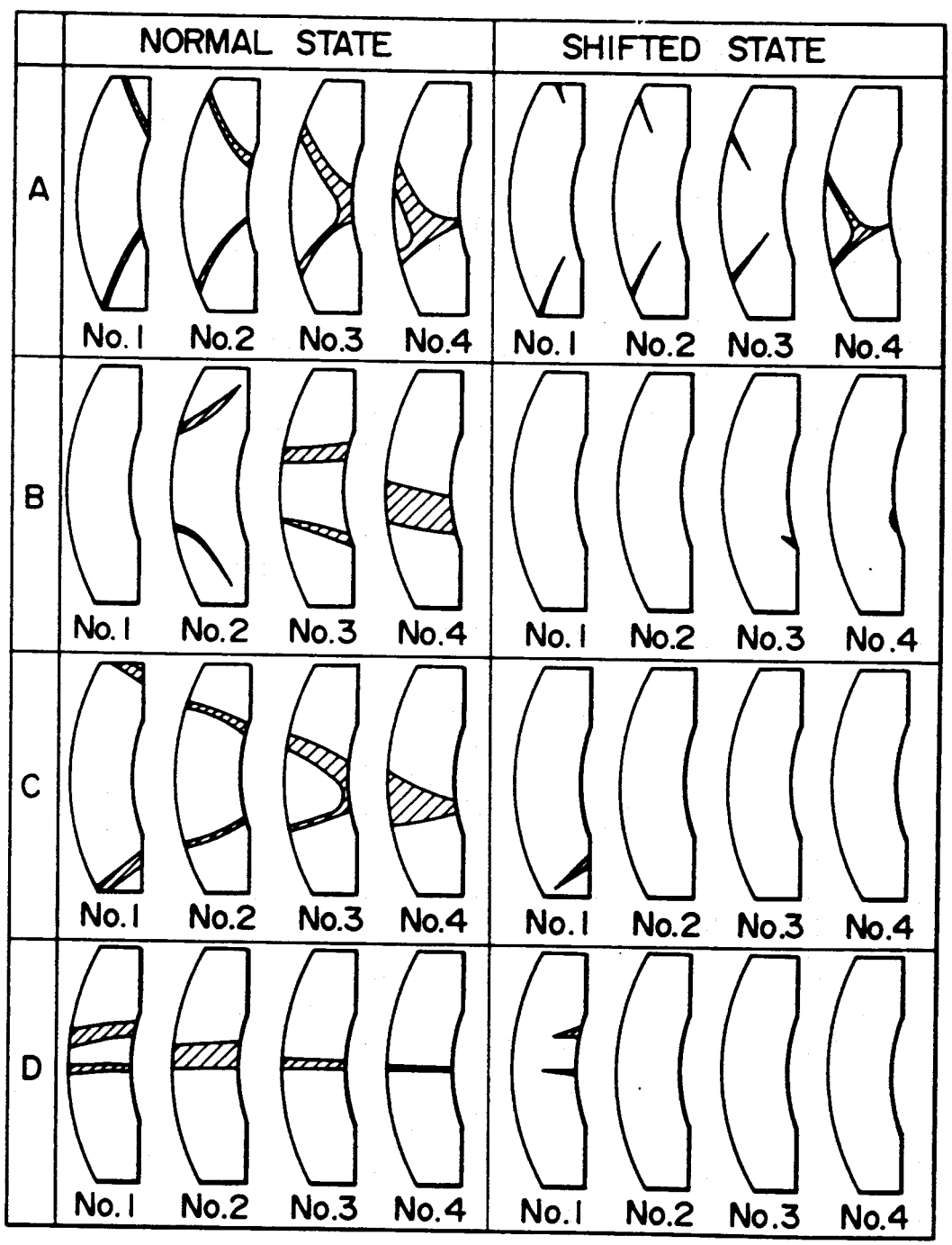
FIGS. 4(A) to 4(D) are an illustrative view which shows variation of a gear tooth engagement surface along which the hourglass worm gear of the present invention meshes with a worm wheel as well as variation of a gear tooth engagement surface along which a prior hourglass worm gear meshes with a worm wheel, respectively.

Next, the results derived from analyzing variation of gear tooth engagement in a loaded state are shown in FIG. 4 with respect to the hourglass worm gear of the present invention of which gear tooth dimensions are shown in Table 2.

TABLE 2

| | | A | B | C | D |
|---|---|---|---|---|---|
| center distance between worm gear and worm wheel | | 100 mm | | | |
| speed reduction ratio | | | 90 | | |
| dimensions associated with grinding wheel | a | | 20.061 mm | 10 mm | 41 mm |
| | b | | 3.126 mm | 27.3 mm | |
| | c | | 100 mm | | |
| | r | 20 mm | −20 mm | | |

TABLE 2-continued

| | A | B | C | D |
|---|---|---|---|---|
| δ | | 12° | | 12.5° |

When it is presumed that shaft displacement takes place such that the hourglass worm gear is displaced toward the starting side of gear tooth engagement relative to the worm wheel in a loaded state by a distance of 50 microns in parallel with the rotational shaft located at the normal position, and the center distance e between the worm shaft and the wheel shaft is elongated by a distance of 25 microns, about 45% of the total normal gear tooth engagement area is maintained as a tooth engagement region when the radius r is 0.2 e. In contrast with the hourglass worm gear of the present invention, the conventional hourglass worm gear has a total normal gear tooth engagement area which is smaller than 10% of that of the hourglass worm gear of the present invention.

Figure 8:
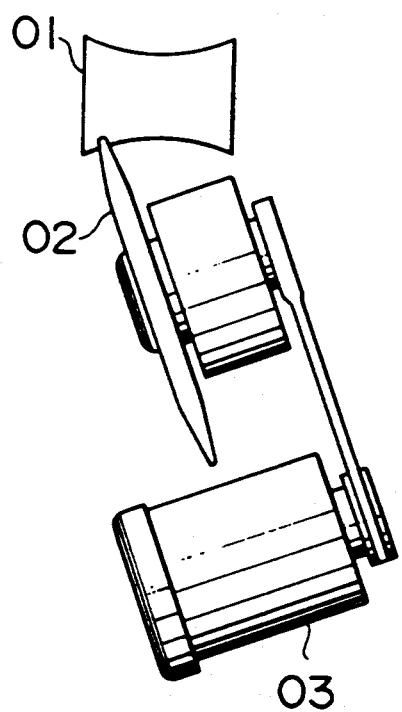
FIG. 8 is a plan view which schematically illustrates arrangement of a grinding wheel for producing a prior hourglass worm gear adapted to mesh with a worm wheel by utilizing the conical surface of a conical type grinding wheel.
Figure 9:
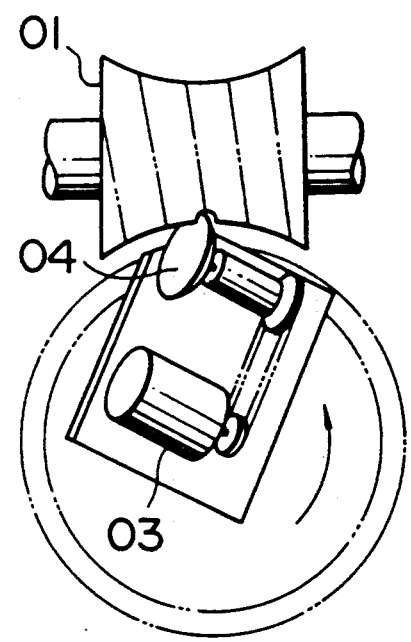
FIG. 9 is a plan view which schematically illustrates a grinding wheel for producing a prior hourglass worm wheel adapted to mesh with a worm wheel by utilizing the bottom surface of a conical type grinding wheel.
Figure 10:
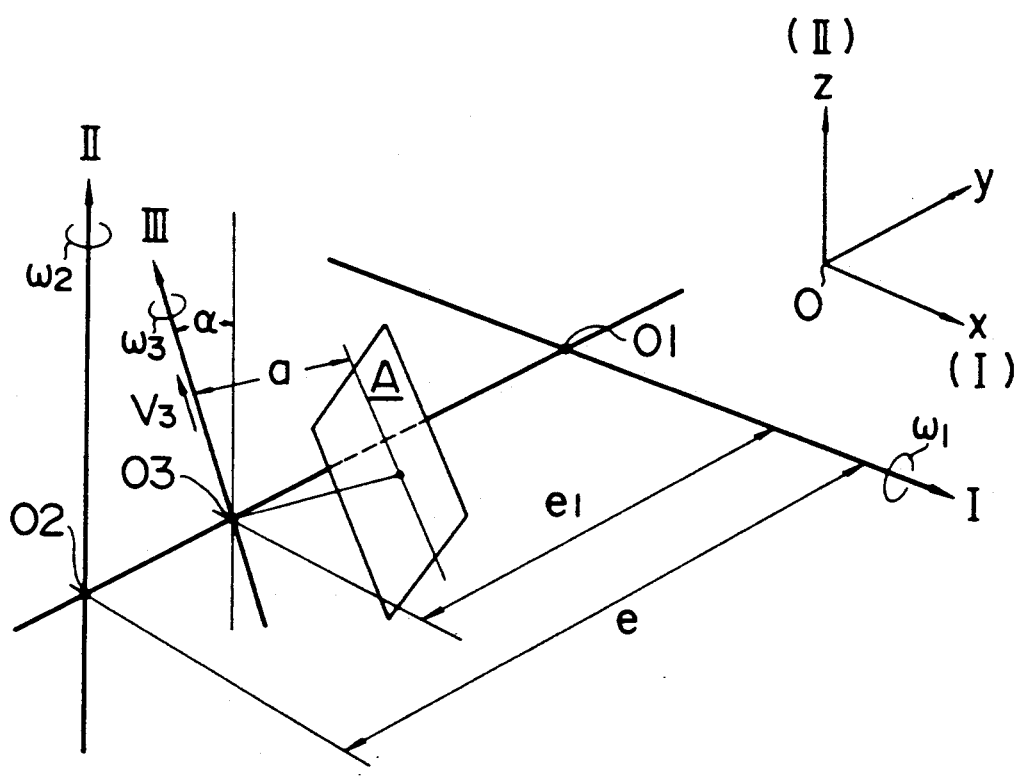
FIG. 10 is a perspective view which schematically illustrates a prior art relationship among a worm shaft, a wheel shaft and an intermediate gear shaft to explain an intermediate gear theory which is applicable to a case where a conventional hourglass worm gear is produced by using an intermediate gear.

In Table 2, A represents a case where the radius of the hourglass worm gear of the present invention has a non-linear circular arc tooth shape is 0.2 e, B represents a case where the radius of the hourglass worm gear of the present invention has a non-linear circular arc tooth shape is $-0.2$ e, C represents a case where the conventional hourglass worm gear as shown in FIG. 8 is used, and D represents a case where the conventional hourglass worm gear as shown in FIG. 9 is used.

Referring to FIG. 4 again, the shaded part r black designates a gear tooth engagement portion and No. designates the number of each worm wheel.

SECOND EMBODIMENT

Next, an hourglass worm gear in accordance with a second embodiment of the present invention will be described below with reference to FIG. 5 and FIG. 6.

In the drawings, A1 designates a worm shaft, A2 designates a wheel shaft, A3 designates a tool shaft, A designates a grinding wheel shaft, Q designates a center of a circular arc representing a sectional shape of a grinding wheel, $S_C$ designates a circular arc representing the sectional shape of the grinding wheel, $S_Q$ designates a locus scribed by the point Q about the grinding wheel shaft A, r designates a radius of the circular arc $S_c$, R designates a radius of rotation of the point Q, δ, designates an inclination angle of the grinding wheel shaft A, $e_1$ designates a quantity of offsetting of the grinding wheel shaft A, b designates a quantity of offsetting of the radius of rotation R of the point Q at the foot part of the same, e designates a center distance between the worm shaft A1 and the wheel shaft A2, $\phi_1$ designates an angle of rotation of the worm gear, $\omega_1$ designates an angular speed of the worm gear, $\phi_2$ designates an angle of rotation of the worm wheel, $\omega_2$ designates an angular speed of the worm wheel, $\phi_3$ designates an angle of rotation of the tool, $\omega_3$ designates an angular speed of the tool. i is a ratio of the angular speed of the worm gear to the angular speed of the worm wheel, i.e., $\omega_1/\omega_2$, wherein $\phi_1$ is represented by $\phi_1 = f_{31}\phi_3 + f_{32}\phi_2 + f_{33}\phi_3$.

According to the second embodiment, a series of gear tooth surfaces on the hourglass worm gear are successively generated by using a grinding wheel including a torus surface in the form of a circular arc as a grinding wheel surface as viewed in a cross-sectional plane in the same manner as the first embodiment of the present invention.

To perform a worm gear tooth generating operation, a system of machining a blank for the hourglass worm gear in a shifted state at a different speed, wherein a ratio of the number of revolutions of a tool shaft to the number of revolutions of a shaft of a blank for the worm gear to be machined and a center distance between the worm shaft and the wheel shaft are changed from those specified based on given gear dimensions, during the worm gear tooth surface generating operation, is employed for practicing the second embodiment of the present invention.

In addition, a series of gear tooth surfaces on the hourglass worm gear are successively generated by continuously changing the ratio of the number of revolutions of the worm shaft to the number of revolutions of the tool shaft during the worm gear tooth surface generating operation.

Figure 5:
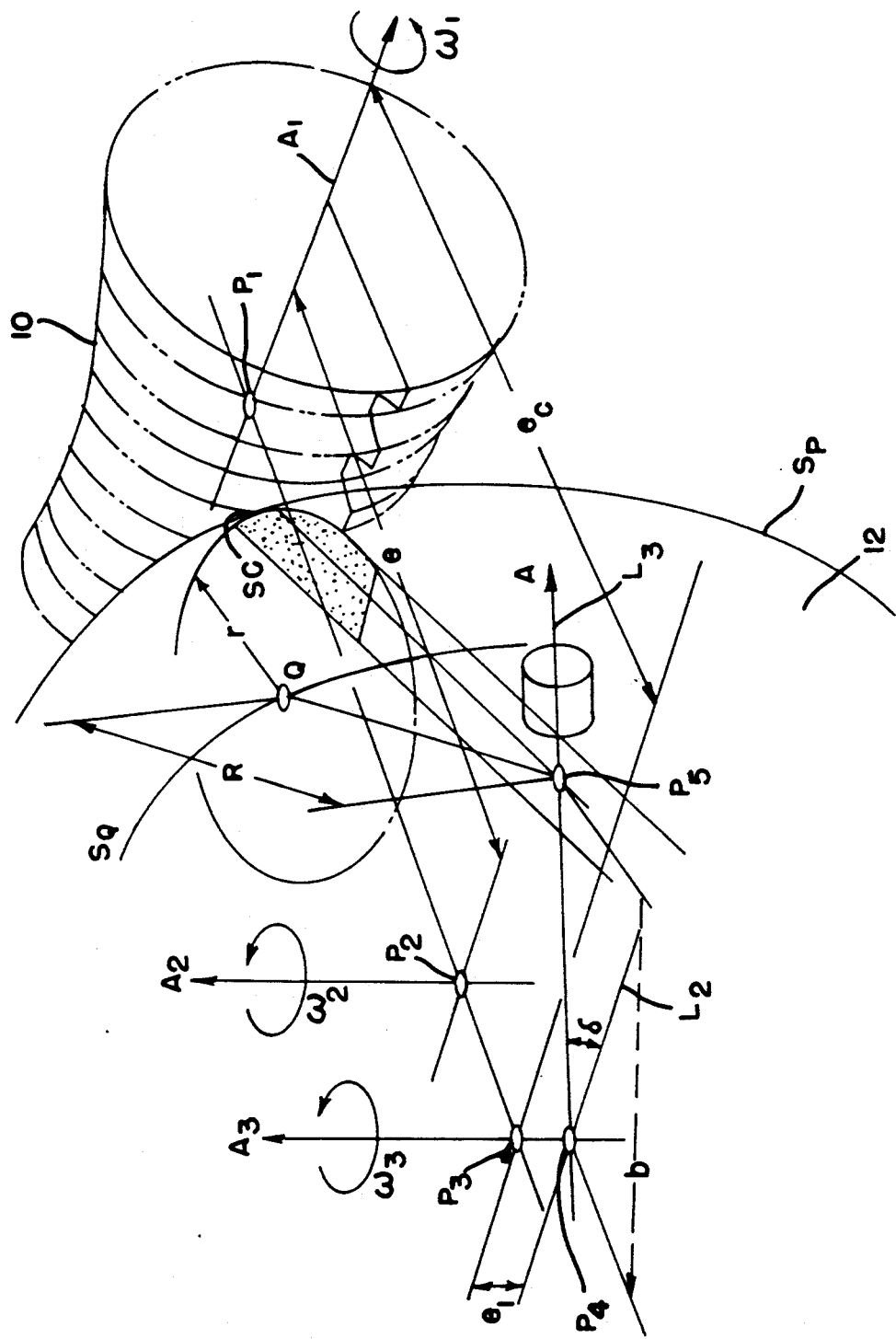
FIG. 5 is a perspective view of the worm gear and a circle $S_P$ as a trace of a point on the surface $S_c$ of the torus.

Referring to FIG. 5 and FIG. 6 again, it is assumed that the straight line intersecting the worm shaft A1 and the wheel shaft A2 at a right angle is represented by L1, the intersection where the worm shaft A1 intersects the straight line L1 is represented by P1, the intersection where the wheel shaft A2 intersects the straight line L1 is represented by P2, the distance between the point P1 and the point P2 is represented by e, the point located on an extension extending from the straight line L1 in the direction toward the point P2 is represented by P3, the distance between the point P1 and the point P3 is represented by $e_C$, the tool shaft extending through the point P3 in parallel with the wheel shaft A2 is represented by A3, the point located on the tool shaft A3 away from the point P3 by a distance of $e_1$ is represented by P4, the straight line extending through the point P4 in parallel with the worm shaft A1 is represented by L2, the straight line derived by turning the straight line L2 about the point P3 by an angle δ in a plane inclusive of the tool shaft A3 is represented by L3 which corresponds to the grinding wheel shaft A, the point located on the straight line L3 away from the point P4 by a distance of $b_2$ is represented by P5, the point located at the position away from the point P5 by a distance of R in a perpendicular plane relative to the straight line L3 extending through the point P5 is represented by Q and the circular arc having a radius r with the point Q as a center in the foregoing perpendicular plane is represented by $S_C$. With such arrangement as mentioned above, a grinding wheel surface is formed on the torus surface which has been formed by turning the circular arc $S_C$ about the straight line L3. It should be noted that when the radius r is more than zero, the resultant grinding wheel surface exhibits a convex torus contour and when the radius r is less than zero, the resultant grinding wheel surface exhibits a concave torus contour.

A required hourglass worm gear is produced by arranging a grinding wheel shaft A, i.e., a rotational shaft of the grinding wheel including a torus surface such that the grinding wheel shaft A coincides with the straight line L3 and then gradually turning the grinding wheel about the tool shaft A3 while rotating the grinding wheel about the grinding wheel shaft A at a high speed. At this time, rotation of the grinding wheel about the tool shaft A3 is synchronized with rotation of a blank for the worm gear about the worm shaft A1 in accordance with gear generating theory.

A series of gear tooth surfaces on the worm wheel are successively generated based on the same center distance and rotational ratio as those specified by given gear dimensions, by using a hob including the same curved surface as that of the gear tooth surfaces on the worm gear as a basic curved surface (see FIG. 5). Gear tooth dimensions and gear tooth generating dimensions employed for practicing the second embodiment of the present invention are as shown in Table 3.

TABLE 3

|  |  | II - A | II - B |
|---|---|---|---|
| center distance between worm gear and worm wheel | | 100 mm | |
| angle between worm gear shaft and worm wheel shaft | | 90° | |
| speed reduction ratio | | 40 | |
| gear tooth cutting dimensions | $e_C$ | 127.7 mm | 104 mm |
| | $f_{31}$ | 53.85 | 42 |
| | $f_{32}$ | −2.6502 | −0.46221 |
| | $f_{33}$ | 1.1739 | 0 |
| | r | 70 mm | 60 mm |
| | R | 80 mm | 80 mm |
| | δ | 1°35′2″ | 1°7′54″ |
| | $e_1$ | 37.308 mm | 37.126 mm |
| | $b_2$ | 8.031 mm | 10.591 mm |

Figure 6:
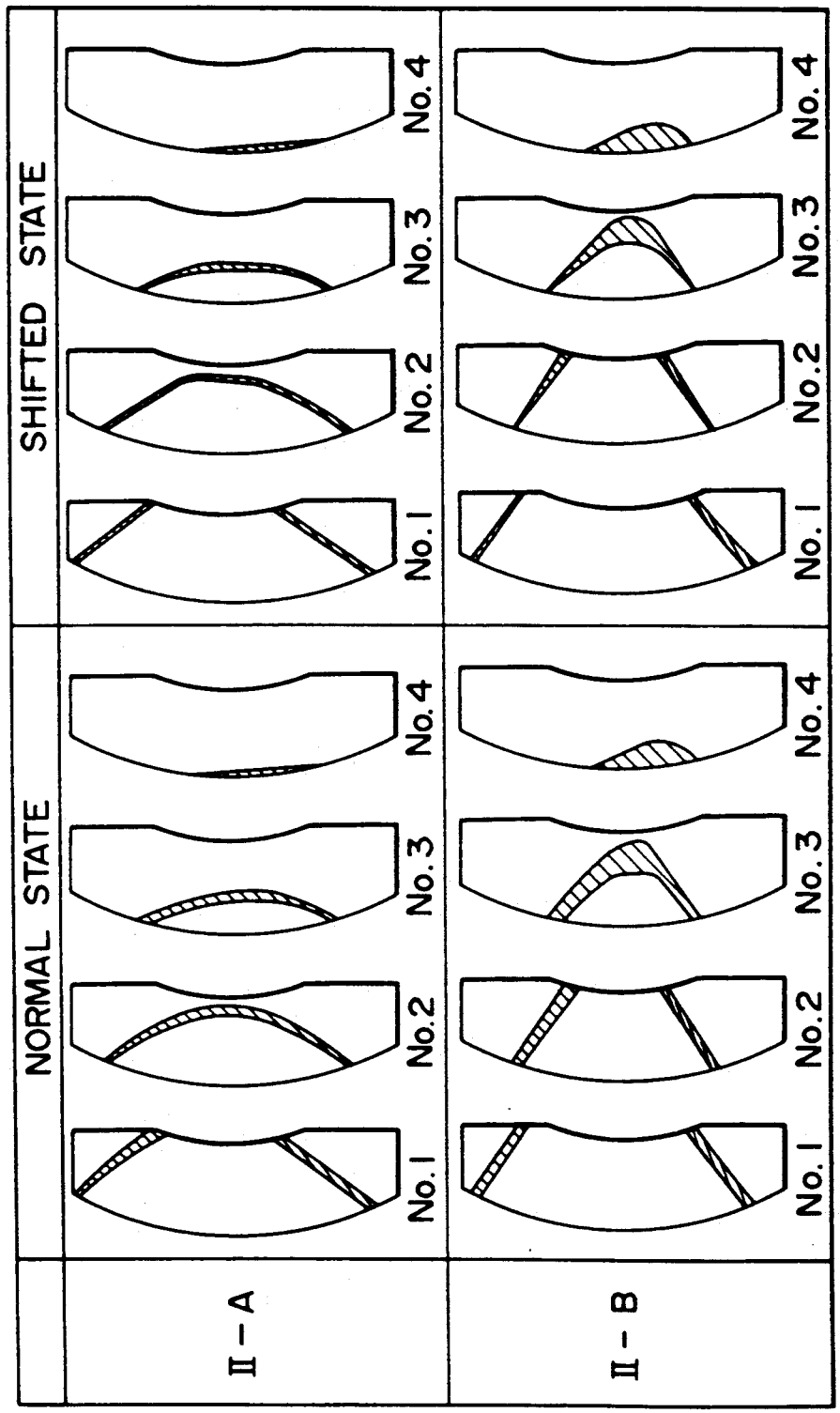

The results derived from analyzing gear tooth engagement with the hourglass worm gear in accordance with the second embodiment of the present invention under conditions that the worm gear is displaced toward the gear tooth engagement starting side by a distance of 50 microns relative to the worm wheel in a loaded state and the worm gear is displaced further by a distance of 25 microns in the direction of elongation of the center distance are shown in FIG. 6 together with those derived in a case where no displacement takes place (with normal gear tooth engagement maintained).

As is apparent from FIG. 6, according to the second embodiment of the present invention, an effective gear tooth engagement area of 70 to 80% can be obtained. In the drawing, the shaded part designates a gear tooth engagement portion and No. designates the number of each gear tooth on the worm wheel.

As will be apparent from the above analysis, the hourglass worm gear tooth generated in accordance with the aforementioned gear cutting principle makes it possible to make adjustment such that a group of projections derived from projecting a group of normal lines relative to contact points on each gear tooth surface onto the plane relative to the worm wheel shaft pass through the center of rotation of the circular arc of the grinding wheel during displacement of either shaft in a loaded state or pass through a narrow region in the vicinity of the center of rotation of the same, resulting in undesirable reduction of an effective gear tooth engagement area in the loaded state being prevented reliably.

Since the hourglass worm gear of the present invention assures that pressure on the gear tooth surface can substantially be reduced to a level of about 1/5 in contrast with the conventional hourglass worm gear, an engineering plastic material (e.g., MC nylon) can be employed as a material for the worm wheel, provided that the hourglass worm gear is dimensioned to have the same size as that of the conventional hourglass worm gear. Consequently, the following advantageous effects can be expected with the hourglass worm gear of the present invention.

(a) It becomes possible to use an assembly of the hourglass worm gear and the worm wheel without any lubricant.

(b) Generation of noisy sound can be reduced substantially (e.g., 70 dB(A) of the conventional hourglass worm gear can be reduced to a level of 45 dB(A) with the hourglass worm gear of the present invention).

(c) Weight of the assembly of the hourglass worm gear and the worm wheel can be reduced to a level of 1/7 compared with an assembly of the conventional hourglass worm gear and the opponent worm wheel.

(d) A production cost can be reduced to a level of ½ compared with the conventional hourglass worm gear.

While the present invention has been described above with respect to the two preferred embodiments thereof, it should of course be understood that the present invention should not be limited only to these embodiments but various changes or modifications may be made without departure from the scope of the invention as defined by the appended claims.

We claim:

1. A method for producing an hourglass worm gear, comprising the steps:

(1) orienting a blank for a worm gear on a worm shaft;

(2) establishing a wheel shaft perpendicular to said worm shaft, such that a first line intersecting said worm shaft and said wheel shaft at right angles defines a distance e along said first line, between said worm shaft and said wheel shaft;

(3) establishing a second line parallel to said worm shaft and intersecting said first line at a distance a beyond an intersection of said wheel shaft and said first line;

(4) establishing a third line by turning said second line about said first line by an angle δ;

(5) establishing a fourth line parallel to said first line and intersecting said third line at a distance b from an intersection of said second and third lines;

(6) establishing a fifth line intersecting said fourth line at a distance c from an intersection of said third and fourth lines, said fifth line lying in a plane defined by said first, second and third lines, said fifth line forming an angle a with said fourth line;

(7) providing a grinding wheel shaped as a torus;

(8) orienting said grinding wheel with its axis along said third line, said torus having a circular cross-section of radius r, a center of said circular cross-section being oriented at a point Q along said fifth line and spaced from an intersection of said fourth and fifth lines by a distance equal to said radius r, whereby r is selected from a range of $r=(-0.3\ \text{to}\ 1.0)e$; and (9) grinding a series of teeth into said blank for said worm gear by gradually turning said grinding wheel about said wheel shaft, while rotating said grinding wheel about said third line at a high speed and rotating said blank about said worm shaft in sync with said high speed rotation of the grinding wheel about said third line.

2. A method for producing an hourglass worm gear, comprising the steps:

(1) orienting a blank for a worm gear on a worm shaft;

(2) establishing a wheel shaft perpendicular to said worm shaft, such that a first line intersecting said worm shaft and said wheel shaft at right angles defines a distance e along said first line, between said worm shaft and said wheel shaft;

(3) establishing a tool shaft perpendicular to said worm shaft and parallel to said wheel shaft, such that said tool shaft intersects said first line and defines a distance $e_c$ along said first line, between said worm shaft and said tool shaft;

(4) establishing a second line parallel to said worm shaft and perpendicular to said tool shaft at a distance $e_1$ below an intersection of said tool shaft and said first line;

(5) establishing a third line by turning said second line about said first line by an angle $\delta$;

(6) establishing a fourth line perpendicular to said third line and intersecting said third line at a distance $e_2$ from an intersection of said third line and said tool shaft;

(7) providing a grinding wheel shaped as a torus;

(8) orienting said grinding wheel with its axis along said third line, said torus having a circular cross-section of radius r, a center of said circular cross-section being oriented at a point Q on said fourth line at a distance R from an intersection of said third line and said fourth line, whereby r is selected from a range of $$r = (-0.3 \text{ to } 1.0)e; \text{ and}$$

(9) grinding a series of teeth into said blank for said worm gear by gradually turning said grinding wheel about said tool shaft, while rotating said grinding wheel about said third line at a high speed and rotating said blank about said worm shaft in sync with said high speed rotation of the grinding wheel about said third line.

* * * * *